United States Patent [19]
Kaemper

[11] Patent Number: 5,902,082
[45] Date of Patent: May 11, 1999

[54] TIE-DOWN DEVICE

[75] Inventor: Hans-Werner Kaemper, Wuerselen, Germany

[73] Assignee: Spanset Inter AG, Oetwil am See, Switzerland

[21] Appl. No.: 08/789,584

[22] Filed: Jan. 28, 1997

[30] Foreign Application Priority Data

Mar. 27, 1996 [DE] Germany .................. 296 06 353 U

[51] Int. Cl.$^6$ ............................................. B60P 7/08
[52] U.S. Cl. ........................... 410/20; 410/9; 410/10; 410/12
[58] Field of Search .................... 410/9, 10, 12, 410/20, 21, 50, 97, 100; 248/499; 24/68 CD, 265 CD

[56] References Cited

U.S. PATENT DOCUMENTS

| | | | |
|---|---|---|---|
| 1,279,397 | 9/1918 | Michod | 410/20 |
| 1,990,562 | 2/1935 | Otis | 410/20 X |
| 2,046,855 | 7/1936 | Tobin | 410/20 |
| 2,047,503 | 7/1936 | Wilson et al. | 410/20 |
| 4,479,746 | 10/1984 | Huber | 410/21 |
| 5,011,347 | 4/1991 | Bullock | 410/9 |
| 5,108,237 | 4/1992 | Zankich | 410/21 |
| 5,316,421 | 5/1994 | Bullock et al. | 410/9 |

FOREIGN PATENT DOCUMENTS

| | | |
|---|---|---|
| 2 723 892 A1 | 3/1996 | France . |
| 82 17 226 U | 12/1982 | Germany . |
| 43 35 603 A1 | 5/1995 | Germany . |

*Primary Examiner*—Stephen T. Gordon
*Attorney, Agent, or Firm*—Venable; George H. Spencer; Robert Kinberg

[57] ABSTRACT

A device for tying down vehicles on a transport loading surface includes a tie-down strap that acts on a vehicle wheel via a guide disposed between the strap and the wheel, wherein the tie-down strap is prestressed.

10 Claims, 2 Drawing Sheets

TIE-DOWN DEVICE

CROSS-REFERENCE TO RELATED APPLICATIONS

The right of priority is claimed with respect to German application No. 296 06 353.3 filed in Germany on Mar. 27, 1996, the disclosure of which is incorporated herein by reference.

BACKGROUND OF THE INVENTION

The present invention relates to a device for tying down vehicles on loading surfaces of transport vehicles. The invention particularly relates to securing vehicles to truck loading surfaces for transport by truck.

It is known to use a tie-down system comprising a tie-down band, bracing parts and spacing elements for this purpose. The tie-down system is embodied by wrapping or looping the lashing strap around one of the vehicle wheels so that the strap assumes a position between spacing elements. To this end, spacing elements are distributed along the wheel circumference that forms the running surface of the wheel. The tie-down strap is tensed by the spacing elements, and thus directly by the running surface. The tie-down force is initiated by means of a known tension element, for example a tightening ratchet.

The spacing elements serve to keep the tire disposed on the wheel free from tie-down forces or tie-down tensions. These tie-down forces or tie-down tensions would only propagate insufficiently due to the high frictional resistance between the surface of the belt band of the tie-down strap and the rubberized running surface of the tire. Moreover, tie-down tensions of different intensities would build up at the different wheels of a vehicle to be transported, which would be undesirable. It is desirable to apply approximately the same tie-down tension to all of the tied-down wheels. Finally, it has been seen that the belt band becomes worn undesirably quickly without the use of spacing elements.

A disadvantage with use of known spacing elements is that it is necessary for the operator to use both hands to mount the spacing elements and the belt band. Specifically, the operator must simultaneously secure the flexible, loose belt band and the spacing elements to the wheel. Because the loading surfaces of trucks are not usually located at ground level and, in addition, two loading levels are typically provided on automobile transporters, the operator cannot use one hand to hold on to the transporter, which can lead to falls from great heights in extreme cases. The risk of falls and subsequent injuries has already been cause for harsh criticism from associated trade organizations.

SUMMARY OF THE INVENTION

With these problems in mind, an object of the invention is to improve the operating reliability of the generic tie-down devices, particularly with respect to mounting.

The above and other objects are accomplished in accordance with the invention by the provision of a device for tying down vehicles on a transport loading surface, comprising: a tie-down strap for acting on a vehicle wheel; a guide for being disposed between the strap and the wheel and on which the tie-down strap rests against the wheel; and means for prestressing the strap against the wheel via the guide.

A primary concept underlying the invention is the adaptation of a guide on the tie-down belt that is disposed between the tie-down strap and the vehicle in the final mounting position. The guide can be connected to the tie-down belt by means of eyelets or similar fastening devices. It is also conceivable to provide the side of the guide facing the tie-down belt with a guide groove, in which the tie-down belt lies form-fittingly. A primary advantage of the invention is the possibility of simplifying mounting to require only one hand. The operator can therefore hold on to the transporter with the other hand. Because mounting is so simple, the operator need not concentrate intently on the procedure, and can focus on holding on and not falling from the loading surface.

Additional features of the invention relate to the arrangement of the guide on the tire running surface formed by the wheel circumference. In particular, the guide is preferably shaped as a half-ring, so to speak, and can be set easily onto the tire running surface. For adaptation to different tire sizes, the guide is flexible in the direction of its central longitudinal axis. In this way, the guide can be bent such that its flat side conforms, as it were, to the running surface. According to a further aspect of the invention, the adaptation of the tie-down strap on the guide is also left open.

Another feature of the invention relates to an advantageous embodiment of the guide. Here the guide is configured as a semicircular yoke in the final mounting position, with guide eyelets on the side facing the running surface of the wheel. The tie-down strap is simply drawn through the guide eyelets.

Other features of the invention relate to a guide configured as a textile hose. This hose is simply drawn over the tie-down strap. A portion of the tie-down strap therefore extends embedded in the hose. The advantage of this embodiment lies in its easy mounting. Furthermore, all of the parts required for this embodiment are available on the market as standard tie-down technology parts, so that the costs associated with realizing this embodiment are low.

It is advantageous to use a commercially available protective hose as a tie-down belt, and to attach at least one reinforcing body in an edge region of the protective hose, advantageously on both sides. To facilitate the attachment of the reinforcing bodies, it is advantageous to provide hollow chambers that receive the reinforcing bodies on the hose. A simple form of reinforcing bodies available on the market is commercially available piping. Such piping comprises an inner molded part, which is encased in a textile band, and one or a plurality of tags for sewing or gluing the piping to the protective hose.

To improve the useful properties and extend the service life of the guide element, it is advantageous to attach a support, preferably made of flexible plastic material, to a working surface of the guide facing the running surface of the wheel. For this purpose, the support has both a surface roughness or profile depth that allows it to dig, so to speak, into the profile of the wheel to be secured.

In another advantageous embodiment, the guide is configured as a flexible tube comprised of tube segments that are seated so as to pivot toward one another, and advantageously have a rectangular cross section as an adaptation to the tie-down strap. They are known as commercially available "clip hoses." The tie-down strap is also simply drawn through the tube in this embodiment. The tube having a rectangular cross section and therefore a flat shape rests with one wide, flat side on the running surface of the wheel, and conforms to the wheel circumference in the manner of an armored vehicle chain.

Another aspect of the invention relates to a modular embodiment of the tube. In this instance, a plurality or an arbitrary number of tube segments can be linked or clipped together to form a tube. If a permanent connection of the individual tube segments is desired in the use of the clip connection, it is-proposed to spot-weld the clip locations. This type of guide is conventional in, for example, cable technology for supply lines of industrial robots or similar devices.

The invention, along with further features and advantages, is described in detail below in conjunction with the drawings.

DETAILED DESCRIPTION OF THE INVENTION

Figure 1:
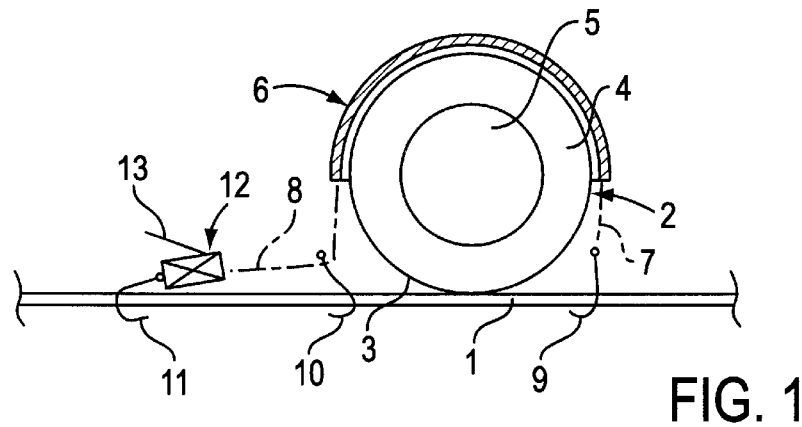
FIG. 1 is a schematic side elevation which shows an attachment of a tie-down device to a vehicle wheel and a truck loading surface according to the principles of the invention.

Referring to FIG. 1, there is shown a wheel 2, comprised of a tire 4, having a running surface 3, on a rim 5. Wheel 2 stands, with its running surface 3, on a loading surface 1 of a truck (not shown). A half-ring shaped guide 6 lies on a region of running surface 3, facing away from loading surface 1. A belt band 7 of a tie-down strap 8 is guided through guide 6. Tie-down strap 8 additionally comprises a hook shaped end brace 9, a deflecting hook 10 and a ratchet hook 11, which is coupled to a tension ratchet 12. To introduce tie-down tension into tie-down strap 8, tension ratchet 12 has ratchet lever 13. Belt band 7 is wound around a tension shaft of tension ratchet 12, which shaft is disposed on the ratchet and is not shown in the drawings, by a back-and-forth movement of a ratchet lever 13. The tie-down tension is built up as a consequence of the shortening of the portion of the belt band located outside of the ratchet, which is associated with the winding of the belt band. In a region of guide 6, belt band 7 conforms to running surface 3 of wheel 2. Outside of guide 6, belt band 7 converges with load surface 1 at a right angle. The positioning of end brace 9 near the wheel and the corresponding positioning of deflecting hook 10 near the wheel, both of which are shown in the drawings, assure the extension of belt band 7 at a right angle with respect to loading surface 1. Both end brace 9 configured as a hook and deflecting hook 10 can be easily the hooked into the truck loading surface 1 which is configured as a grate.

Figure 2:
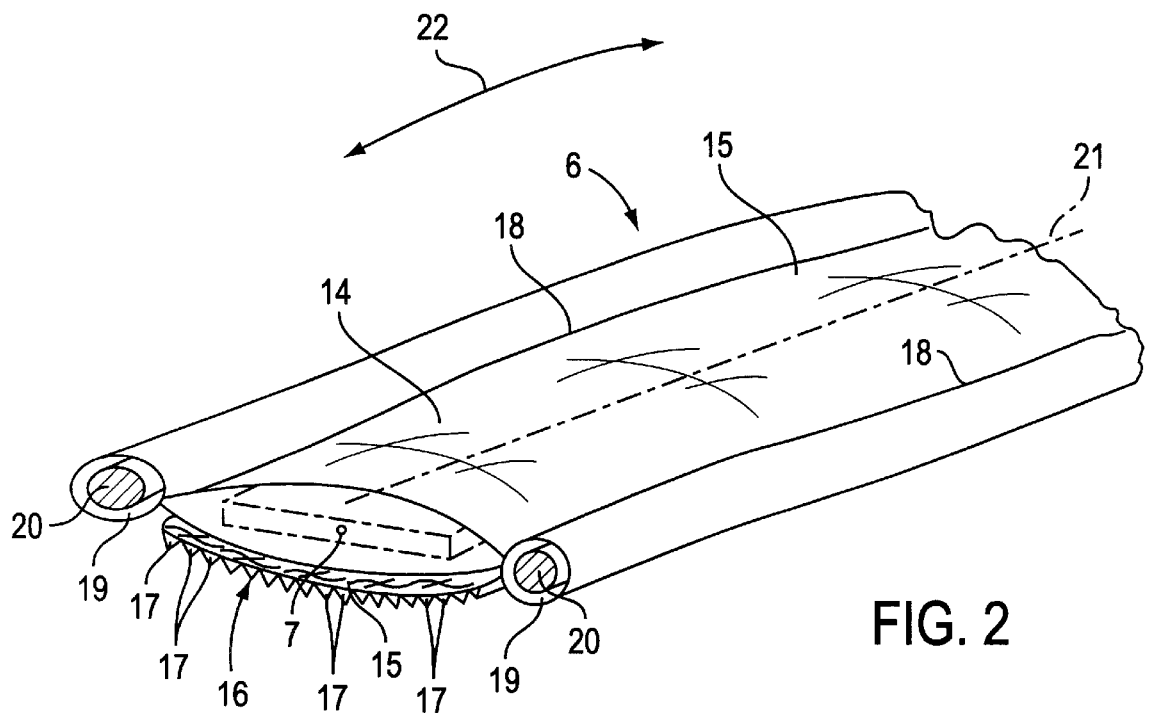
FIG. 2 is a perspective view which shows an embodiment of a guide configured as a hose.

FIG. 2 shows a variation of guide 6 as a textile hose 14. Belt band 7 lies inside hose 14. Hose 14 rests with one of its hose surfaces 15 on running surface 3 of wheel 2. In the illustrated embodiment, hose surface 15 facing downward is covered by an additional, profiled support 16. Support 16 has individual profiled teeth 17, which are in frictional lockup with running surface 3 of wheel 2. Hose 14 has edges 18 at which hollow chambers 19 are fixed. Hollow chambers 19 receive reinforcing bodies 20 configured as piping.

For mounting guide 6 configured as a hose 14 to running surface 3 of wheel 2, hose 14, together with belt band 7 therein, is configured to be flexible in a bending direction 22 in the direction of central longitudinal axis 21.

Figure 3:
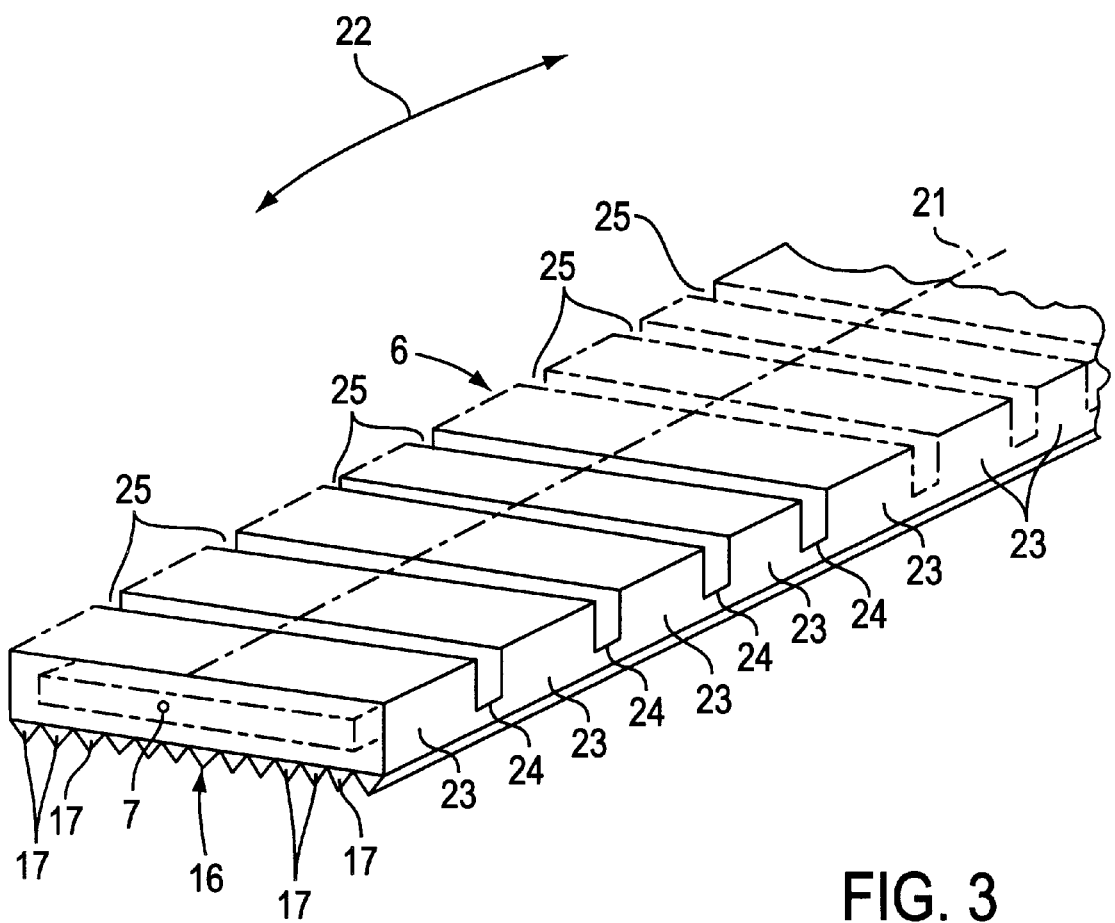
FIG. 3 is a perspective view which shows an embodiment of a guide configured as a tube.

The embodiment of the tube-like guide 6 illustrated in FIG. 3 is also flexible in bending direction 22 in the direction of the central longitudinal axis 21. Guide 6 comprises a plurality of tube segments 23 having a rectangular cross section. Connecting webs 24 are disposed between tube segments 23. Two adjacent tube segments 23 can pivot toward one another in direction 22, with connecting webs 24 each acting in the manner of a live hinge. Accordingly, slots 25 are left open on the tube side walls that are not provided with connecting webs. Slots 25 can be produced easily by cutting into a rectangular tube on three sides at desired intervals. The working surface of the rectangular tube as illustrated in FIG. 3 has a support 16 provided with profiled teeth 17, which form a frictional lockup with the running surface 3 in the final mounting position.

The invention has been described in detail with respect to preferred embodiments, and it will now be apparent from the foregoing to those skilled in the art that changes and modifications may be made without departing from the invention in its broader aspects, and the invention, therefore, as defined in the appended claims is intended to cover all such changes and modifications as fall within the true spirit of the invention.

What is claimed is:

1. A device for tying down vehicles on a transport loading surface, comprising:

a tie-down strap for acting on a vehicle wheel;

a hose for being drawn over the wheel and receiving the tie-down strap so that the tie-down strap can rest against the wheel via the hose, the hose including longitudinal edges and comprising a flexible textile material and a reinforcing body attached to at least one of the longitudinal edges of the hose; and means for prestressing the tie-down strap against the wheel via the hose.

2. A device as defined in claim 1, wherein the tie-down strap acts with a tie-down tension on a circumference of the wheel that forms a running surface of the wheel.

3. A device as defined in claim 1, wherein the hose is adapted to a surface geometry of a running surface of the wheel.

4. A device as defined in claim 1, wherein the hose has a central longitudinal axis, and is flexible in a direction of its central longitudinal axis for resting against a running surface of the wheel so that in operation the hose is bent in semicircular fashion.

5. A device as defined in claim 1, including means defining a hollow chamber that receives the reinforcing body attached to the edge of the hose.

6. A device as defined in claim 5, wherein the means defining the hollow chamber includes a laterally-flanking sewing tag for securing the hollow chamber to the hose.

7. A device as defined in claim 5, wherein the reinforcing body comprises piping.

8. A device as defined in claim 1, and further including a profiled support connected to a working surface of the hose facing a running surface of the wheel for additionally securing the hose to the wheel by means of a frictional lock.

9. A device as defined in claim 8, wherein the support comprises flexible plastic material.

10. A device as defined in claim 1 wherein the hose has a continuous surface for resting against a running surface of the wheel so that the tie-down strap can rest against the wheel via the hose along an entire length of the hose.

* * * * *